United States Patent [19]

Cutburth

[11] Patent Number: 4,640,591

[45] Date of Patent: Feb. 3, 1987

[54] SUPPORT MECHANISM FOR A MIRRORED SURFACE OR OTHER ARRANGEMENT

[75] Inventor: Ronald W. Cutburth, Tracy, Calif.

[73] Assignee: The United States of America as represented by the United States Department of Energy, Washington, D.C.

[21] Appl. No.: 796,464

[22] Filed: Nov. 8, 1985

[51] Int. Cl.$^4$ ............................ G02B 7/18; G02B 5/08
[52] U.S. Cl. .................................... 350/632; 248/479; 248/487; 350/634
[58] Field of Search .............. 350/632, 634, 636, 631; 248/479, 485–487

[56] References Cited

U.S. PATENT DOCUMENTS

| | | | |
|---|---|---|---|
| 3,407,018 | 10/1968 | Miller | 350/634 X |
| 3,478,608 | 11/1969 | Met | 350/634 X |
| 3,566,101 | 2/1971 | Hagner | 350/636 X |
| 3,953,113 | 4/1976 | Shull | 350/634 |
| 4,023,891 | 5/1977 | Chadwick | 350/634 |
| 4,298,248 | 11/1981 | Lapp | 350/634 |
| 4,442,524 | 4/1984 | Reeder et al. | 350/631 X |

*Primary Examiner*—John Petrakes
*Attorney, Agent, or Firm*—P. Martin Simpson, Jr.; L. E. Carnahan; Judson R. Hightower

[57] ABSTRACT

An adjustment mechanism such as a three point spherical mount for adjustably supporting a planer mirror or other type of arrangement relative to a plane defined by a given pair of intersecting perpendicular axes is disclosed herein. This mechanism includes first means for fixedly supporting the mirror or other arrangement such that the latter is positionable within the plane defined by the given pair of intersecting perpendicular axes. This latter means and the mirror or other such arrangement are supported by second means for limited movement back and forth about either of the intersecting axes. Moreover, this second means supports the first means and the mirror or other arrangement such that the latter is not movable in any other way whereby the point on the mirror or other arrangement coinciding with the intersection of the given axes does not move or float, thereby making the ability to adjust the mirror or other such arrangement more precise and accurate.

10 Claims, 4 Drawing Figures

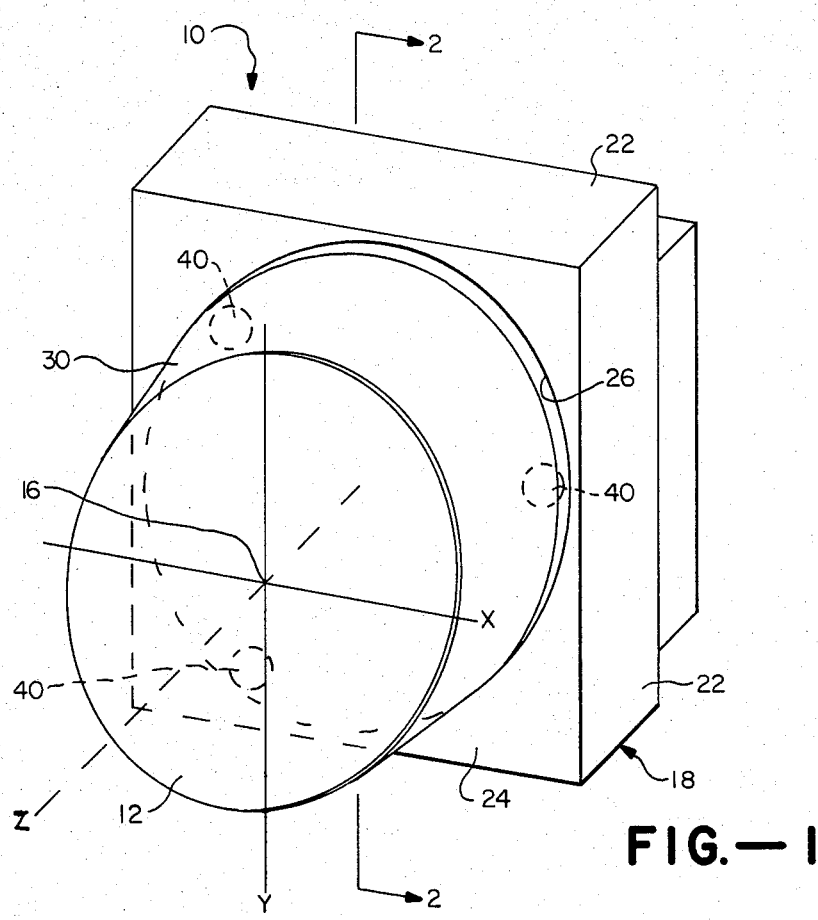
FIG.—1
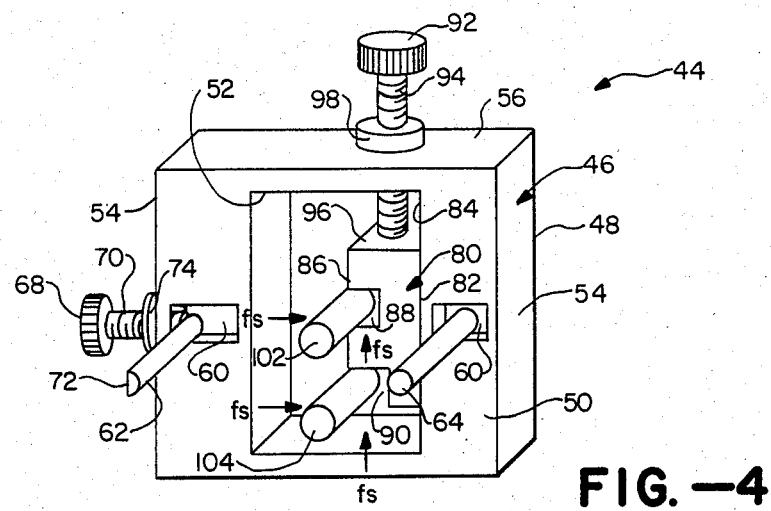
FIG.—4

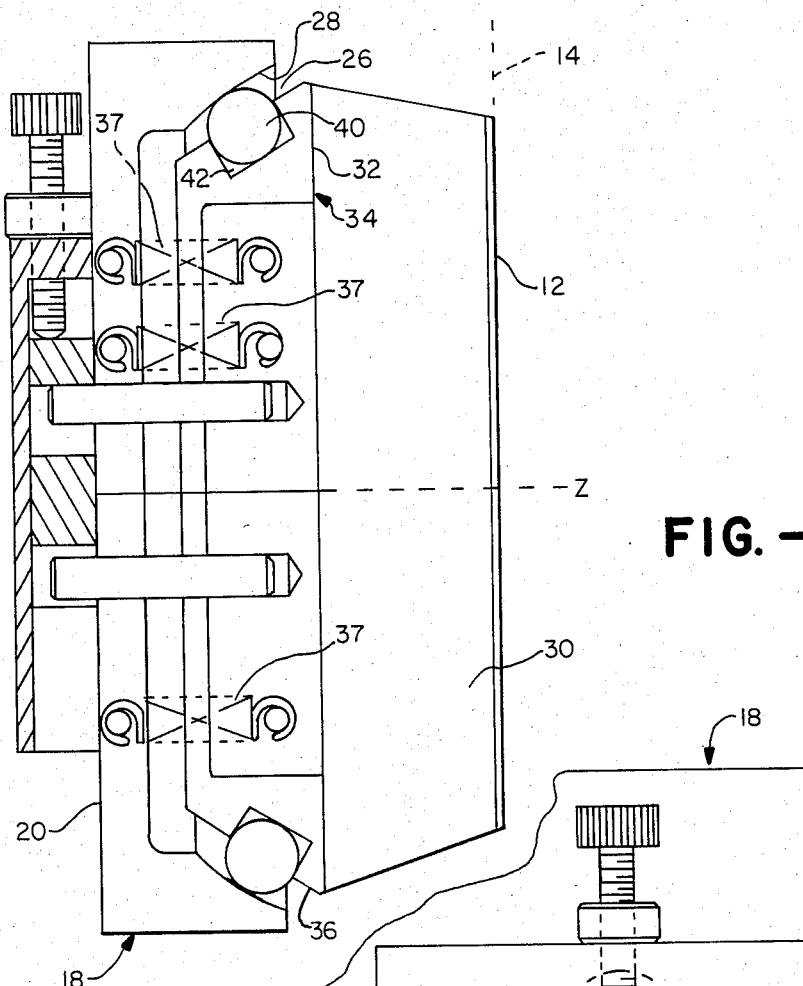
FIG.—2
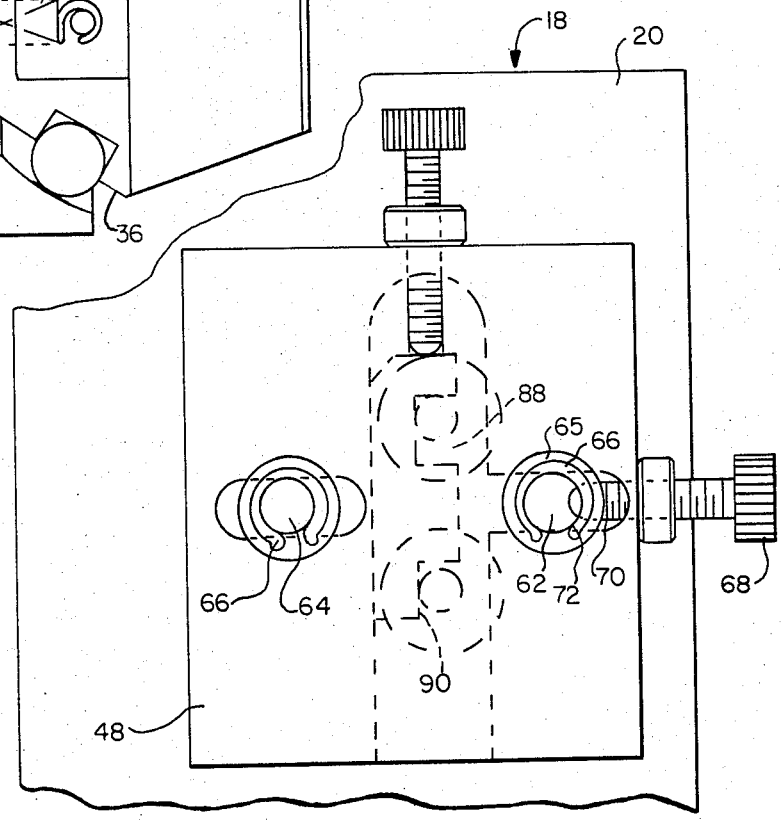
FIG.—3

SUPPORT MECHANISM FOR A MIRRORED SURFACE OR OTHER ARRANGEMENT

FIELD OF THE INVENTION

The United States Government has rights in the invention pursuant to contract number W-7405-ENG-48 between the U.S. Department of Energy and the University of California for the operation of the Lawrence Livermore National Laboratory.

BACKGROUND OF THE INVENTION

The present invention relates generally to a mechanism for supporting a mirrored surface or other such arrangement and more particularly to a spherical mount adjustment mechanism having a non-floating center of adjustment.

The type of support mechanism to which the present invention is particularly directed is a spherical mount adjustment mechanism which will be described in more detail hereinafter. For the moment, it suffices to say that such a mechanism typically includes an annular surface which forms part of a sphere whose center defines the intersection of a pair of intersecting perpendicular axes, which, in turn, defines a particular reference plane. The intended function of the spherical mount adjustment mechanism is to adjustably position a particular arrangement, for example, a mirrored surface, relative to that plane. It does so by supporting the mirrored surface or other such arrangement against the annular surface by suitable bearing means for limited pivotal movement back and forth about the two intersecting axes. In this way, the mirrored surface or other such arrangement can be oriented in a number of different ways relative to the particular plane.

While a spherical mount adjustment mechanism of the type briefly described above is generally satisfactory for adjustably positioning a given arrangement such as a mirrored surface relative to a particular plane, all such arrangements of which applicant is aware have what applicant refers to as floating center points. More specifically, applicant has found that when the typical prior art adjustment mechanism is used to pivot a mirrored surface for example about the two intersecting axes which defines its associated reference plane, the point on the mirrored surface intended to coincide with the intersection of these axes tends to float to a limited extent, that is, moves in a some what unpredictable manner. This, in turn, makes it difficult to position the mirrored surface at precisely the desired orientation relative to its reference plane. On the otherhand, any attempts to lock this center point in place will tend to cause the mirrored surface to rotate in an uncontrolled manner about the locked in point or will cause the support points to bind. Thus, the use of the term "floating center" herein will also refer to the uncontrolled rotation and binding possibilities.

SUMMARY OF THE INVENTION

In view of the foregoing, it is an object of the present invention to provide a particular type of spherical mount adjustment mechanism which does not result in a floating center, as described above.

Another object of the present invention is to provide a support mechanism generally for adjusting the position of a particular arrangement relative to a reference plane defined by a given pair of intersecting perpendicular axes such that the arrangement can be pivoted back and forth about either or both of the intersecting axes without causing its center point to float or the arrangement to rotate uncontrollably or bind at its support points.

Still another object of the present invention is to provide the last mentioned support mechanism generally and the last mentioned spherical mount adjustment mechanism in particular in an uncomplicated and yet reliable way.

As will be described in more detail hereinafter, the support mechanism designed in accordance with the present invention and disclosed herein is one which adjusts the position of a particular arrangement, for example a mirrored surface, relative to a specific reference plane defined by a given pair of intersecting perpendicular axes. This mechanism includes first means for fixedly supporting the mirrored surface or other arrangement such that the latter is positionable within the reference plane. Second means are provided for supporting the first means and the mirrored surface or other such arrangement for limited pivotal movement back and forth about either of the given axes only and whereby that point on the arrangement coinciding with the intersection of the two axes does not float. Finally, the mechanism includes means for selectively moving the first means and the mirrored surface or other such arrangement about the intersecting axes, whereby to adjust the position of the mirrored surface or other such arrangement relative to the reference plane.

In addition to the foregoing, a further advantage of the support mechanism just recited briefly resides in the fact that the mirrored surface can be mounted in front of the primary support system, as will become apparent hereinafter. This conserves space, allowing mirrored surfaces to be placed close together. It also allows the user to more readily change mirrored surfaces and exposes the mirrored surface for cooler operation, making it possible to use a less complicated cooling system.

Additional objects, advantages and novel features of the invention will be set forth in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The over-all mechanism discussed briefly above and its method of operation will be described in more detail hereinafter in conjunction with the drawings wherein:

FIG. 1 is a perspective view of a three point spherical mount adjustment mechanism designed in accordance with the present invention;

FIG. 2 is a side sectional view of the mechanism of FIG. 1, taken generally along line 2—2 in FIG. 1;

FIG. 3 is a back elevational view of the mechanism of FIG 1; and

FIG. 4 is a broken away perspective view of a portion of the mechanism of FIG. 1.

DETAILED DESCRIPTION OF THE INVENTION

Reference will now be made in detail to a preferred embodiment of the invention, an example of which is illustrated in the accompanying drawings. While the invention will be described in connection with this preferred embodiment, it will be understood that it is not intended to limit the invention to that embodiment. On the contrary, it is intended to cover all alternative modifications and equivalents as may be included within the spirit and scope of the invention as defined by the appended claims.

Turning now to the drawings wherein like components are designated by like reference numerals throughout the various Figures, attention is first directed to FIG. 1 which, as stated above, illustrates a three point spherical mount adjustment mechanism designed in accordance with the present invention. This mechanism which is generally indicated by the reference numeral 10 is specifically designed for adjusting the position of a planer mirrored surface 12 relative to a reference plane 14 (see FIG. 2) defined by a given pair of intersecting perpendicular axes. In the particular embodiment illustrated, the plane 14 is a vertically extending plane and the intersecting perpendicular axes are the horizontally and vertically extending x and y axes, respectively, illustrated in FIG. 1.

As will be described in detail hereinafter, mechanism 10 is specifically designed to place the mirrored surface 12 within plane 14 and to pivot the mirrored surface to a limited extent back and forth about the x and y axes while, at the same time, preventing the mirrored surface from moving in any other manner. In that way, mechanism 10 can adjust the position or orientation of mirror 12 relative to plane 14 while, at the same time, that point 16 on the mirrored surface which coincides with the intersection of the x and y axes (hereinafter referred to as the "center point", although it may not actually be the center of the mirrored surface) remains stationary, that is, does not float as the mirrored surface is adjusted. As will be seen hereinafter, this capability of adjusting mirrored surface 12 while maintaining a non floating center point is accomplished in an uncomplicated and yet reliable way.

Referring to FIG. 2 in conjunction with FIG. 1, overall mechanism 10 is shown including a main housing 18 having a closed back side 20, side walls 22 and a front face 24 having an opening 26 into the housing. This opening is defined by an annular surface 28 which forms part of an imaginary sphere whose center defines the intersection of the x and y axes illustrated in FIG. 1. At the same time, annular surface 28 itself defines the horizontal z axis shown in FIGS. 1 and 2 extending through the intersection of the x and y axes.

Still referring to FIGS. 1 and 2, mirrored surface 12 is shown forming the smaller end of a frusto-conical shaped structure 30 having a larger base end fixedly connected to the front end 32 of a disc shaped dish 34 having a rearwardly angled annular edge 36. As best seen in FIG. 2, frusto-conical structure 30 and dish 34 are positioned co-axially with respect to one another and with the z axis partially within opening 26 of housing 18 such that annular surface 36 is in spaced apart confronting relationship with annular surface 28.

The housing 18 and dish 34 are interconnected together in the positional relationship described immediately above by means of three springs SP1, SP2 and SP3, each of which is fixedly connected at opposite ends to the housing and dish by suitable means. One way in which this is accomplished is best illustrated in FIG. 2 which specifically illustrates the springs 37. As will be seen hereinafter, these springs serve an additional purpose over and above interconnecting housing and dish 34 together. However, for the moment, it suffices to keep in mind that the springs serve to interconnect these two components. At the same time, three ball bearings 40 are disposed between annular surfaces 28 and 36 within their own respective pockets 42 provided in the latter surface 36 and, as best seen in FIG. 1, the three ball bearings are equally circumferentially spaced about the confronting annular surfaces.

With housing 18 and dish 34 interconnected in the manner described thus far, that is, by means of springs SP1, SP2 and SP3 and with the ball bearings 40 therebetween, the dish 34 is able to be moved in virtually any direction along the annular surface 28, from its position illustrated in FIGS. 1 and 2. Thus, the dish can be rotated about the z axis, either clockwise or counterclockwise as viewed in FIG. 1 whereby to cause mirrored surface 12 to rotate about the z-axis while remaining in plane 14. At the same time, one side of the dish can be moved into the housing along the annular surface 28 while the opposite side moves outward, thereby causing mirrored surface 12 to pivot about the x axis, the y axis or any other axis which is located in plane 14 and which extends through the z axis.

It should be noted that the combination of movements of the dish relative to the ball bearing surface 28 just described will not only cause the mirrored surface to pivot back and forth and/or rotate relative to plane 14 but will also cause the center point 16 of the mirrored surface to float, that is, move relative to the intersection of the x and y axes. As will be seen hereinafter, overall mechanism 10 includes an arrangement 44 for limiting the movement of dish 34 on its annular ball bearing surface 28 such that mirrored surface 12 is limited to pivotal movement back and forth about the x and y axes only such that its center point 16 remains substantially stationary, that is, coincident with the intersection of the x and y axes and thereby does not float with movement of the mirrored surface.

Referring specifically to FIG. 4 in conjunction with the other figures and especially FIG. 3, attention is now directed to arrangement 44. This arrangement is shown including an outer adjustment block 46 having a closed back side 48, a front face 50 having a rectangular opening 52 into the block, side walls 54 and top and bottom walls 56 and 58, respectively. For reasons to be explained directly below, a pair of elongated through slots 60 parallel to top and bottom walls 56 and 58 extend through adjustment block 46 from its front face to its back face on opposite sides of opening 52.

Still referring specifically to FIGS. 2 and 3, adjustment block 46 is shown positioned against the back side 20 of previously described housing 18 such that top and bottom sides 56 and 58 extend in the direction of the x axis while side walls 54 extend in the direction of the y axis. The adjustment block is supported for limited back and forth movement in the x direction by means of two support rods 62 and 64. Each of the rods is fixedly connected at one end to housing 18 and extends rearwardly therefrom in the z direction. These two support rods preferrably lie within a common horizontal plane through the x axis. As best illustrated in FIGS. 3 and 4, they extend through slots 60 in order to support adjustment block 46 for back and forth movement in the x direction thereon. A washer 66 and cooperating clamp 68 are positioned around the rearwardmost free end of each rod directly behind back side 48 of the adjustment block in order to prevent the adjustment block from moving off of the rods in the rearward, z direction.

An adjustment knob 68 having a threaded shaft 70 is provided for moving adjustment block 46 back and forth on rod 62 and 64. More specifically, the threaded shaft 70 is thread connected into a cooperating opening in side wall 54 of the adjustment block adjacent that slot 60 containing rod 62. As best illustrated in FIG. 3, shaft 70 extends into its adjacent slot 60 such that its free end engages against a confronting flat face 72 extending the length of rod 62. As will be seen hereinafter, the entire adjusting block 46 is spring biased to the right as viewed in FIG. 4 (to the left and viewed in FIG. 3). Thus, the free end of shaft 70 is biased to the right as viewed in FIG. 4 and therefore against the flat side 72 of rod 62. As a result, if knob 60 is rotated in one direction to move shaft 70 further into its cooperating opening, that is, to the right as viewed in FIG. 4, this causes the adjustment block to slide to the left on rods 62 and 60 against the biasing force. On the other hand, if the knob 68 is turned in a way which causes the shaft 70 to move out of its cooperating opening, that is, to the left as viewed in FIG. 4, the adjustment block is caused to slide to the right as a result of the biasing force on it. Therefore, knob 68 can be used to move adjustment block 46 to a limited extend back and forth in the x direction. A lock nut 74 is provided around shaft 70 in order to lock the latter in place once the adjustment block is positioned at the desired location.

In addition to the outer adjustment block 46 described above, overall arrangement 44 includes an inner adjustment block 80 which is disposed within opening 52. This block includes a flat underside 82 which is positioned for slidable movement against the inside shoulder 84 of adjustment block 46 so as to be slidably moveable to a limited extent back and forth along the latter in the y direction. For reasons to be discussed hereinafter, the top side 86 of block 80 includes vertically spaced upper and lower through slots 88 and 90, respectively, which lie in a common vertical plane through the y axis. For reasons which will be made clear below, the inner block 80 is biased against shoulder 84 and in the vertically upward or y direction.

As stated above, inner adjustment block 80 is slidable moveable to a limited extent back and forth along shoulder 84. A knob 92 and associated threaded shaft 94 similar to the knob 68 and shaft 70 are provided for adjustably positioning block 80 at any particular point on shoulder 84. To this end, the shaft 94 is threaded into a cooperating hole through the top side of adjustment block 46 so that its free end extends into opening 52 and against the top 96 of adjustment block 80. Since this latter adjustment block is biased in the vertically upward direction, it is biased against the free end of shaft 94. As a result, if the knob 92 is rotated so as to cause the shaft 94 to move downward, the block 80 is caused to move downward with it. On the other hand, if the knob 92 is rotated so as to cause shaft 94 to move upward, the biasing force on block 80 moves the block up with it. A locking nut 98 is provided around shaft 94 outside adjustment block 46 in order to fix the position of shaft 94 and therefore fix the position of block 80 on shoulder 84.

Thus far, overall arrangement 44 has been described including an outer adjusting block, an inner adjusting block and separate means for moving the two to a limited extent back and forth in the x and y directions, respectively. As will be seen below, this back and forth movement in the x and y directions is necessary to cause mirrored surface 12 to pivot to a limited extent back and forth about the x and y axes illustrated in FIG. 1. This is accomplished by utilizing a pair of upper and lower connecting pins 102 and 104 or other suitable elongated members, each of which is fixedly connected at one end to dish 34, as best illustrated in FIG. 2. The two pins are vertically spaced from one another within a vertical plane extending through the y axis, that is, the same plane as slots 88 and 90 and, as illustrated in FIGS. 3 and 4, the opposite ends of these pins extend into these latter slots.

At the same time, the previously recited springs SP1, SP2 and SP3 which are provided to interconnect dish 34 with main housing 18 are positioned and selected to bias those ends of pins 102 and 104 within slots 88 and 90 to the right, as viewed in FIG. 4, and simultaneously vertically upward, as viewed in the same figure. The force vectors $F_s$ are shown in FIG. 4 to illustrate this overall biasing arrangement. While there are a number of different ways to accomplish this with a plurality of springs, in the particular embodiment illustrated, the springs SP1 and SP3 are selected to have the same tension value while the spring SP2 is selected to have a greater tension value. With these springs so valued and positioned at the locations shown in the drawings, the overall dish 34 is appropriately biased so as to cause the pins 88 and 90 to be biased in the manner described. As a result of this, the pins 102 and 104 bias inner block 80 to the right and upwardly as viewed in FIG. 4 and they bias the combination of the inner block and outer block 46 to the right relative to rods 62 and 64, again as viewed in FIG. 4.

From the foregoing, it should be apparent that the mirrored surface 12 can be adjustably pivoted back and forth about the x axis by moving block 80 back and forth on shoulder 84 of block 46. This is because the coupling pins 102 and 104 are caused to move up and down with block 80, thereby causing the dish 34 (and the mirror) to move with it. At the same time, the mirrored surface can be pivoted back and forth to a limited extent about the y axis by moving the block 46 (and therefore block 80 with it) back and forth in the x direction on rods 60 and 62. This causes the coupling pins 102 and 104 to move with both blocks and therefore causes dish 34 and the mirrored surface to move with it. What is not so apparent is that because coupling pins 102 and 104 are biased in slots 88 and 90, they can only move in the two directions recited. They cannot twist relative to one another and cannot move simultaneously along any other paths. As a result, the dish 34 is limited to corresponding movement, which, in turn, limits the mirrored surface to pivotal movement about the x and y axes only. This, in turn, means that the center point 16 on the mirrored surface, that is, the point which coincides with the intersection of the x and y axes remains stationary, that is, in coincidence with the intersection of these two axes and does not itself float.

There has been described above an overall mechanism for adjusting the position of a mirrored surface in an uncomplicated and reliable way and in a way which does not include a floating center. The particular mechanism illustrated and described was a three point spherical mount adjustment mechanism. It is to be understood that the present invention may be incorporated into support mechanisms other than a three point spherical mount adjustment mechanism and it can be utilized to support other arrangements besides a mirrored surface. Also, while a particular overall arrangement 44 has been shown for limiting the movement of mirrored surface 12 in order to eliminate a floating center point, it is to be understood that other possible arrangements could be utilized for the same purpose, without departing from the broad aspects of the present invention.

The foregoing description of the preferred embodiment has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended thereto.

What is claimed is:

1. A mechanism for supporting first means including a planer surface for movement relative to a vertical plane defined by particular intersecting x and y axes which extend horizontally and vertically, respectively, said mechanism comprising:
   (a) second means including a plurality of segments of an annular surface which forms part of a sphere whose center defines the intersection of said x and y axes, said annular surface defining a z axis extending through the intersection of said x and y axes perpendicular to said vertical plane;
   (b) third means connecting said planer surface including first means with said second means such that said planer surface is positionable within said vertical plane and is itself intersected by said z axis at a particular point thereon, said third means including bearing means disposed between said first means and said segments of said annular surface of said second means for allowing said first means to move in any direction on said annular surface segments including certain specific directions which allow said planer surface to pivot back and forth to a limited extent about both said x and y axes relative to said vertical plane; and
   (c) fourth means interconnecting said first and second means and cooperating with said third means for limiting the movement of said first means to said certain specific directions and thereby limiting the movement of said planer surface to said back and forth pivotal movement about said x and y axes, whereby said particular point defined at the intersection of the z axis with said planer surface remains substantially fixed at the intersection of said x and y axes and within said vertical plane.

2. A mechanism according to claim 1 wherein said second means includes all of said annular surface including said plurality of segments.

3. A mechanism according to claim 1 wherein said third means includes spring means connecting said first means with said second means and wherein said bearing means includes a plurality of ball bearings.

4. A mechanism according to claim 3 wherein said plurality of ball bearings consists of three such bearings.

5. A mechanism according to claim 1 wherein said fourth means includes:
   (a) first and second spaced apart, elongated members fixedly connected to and extending out from said first means in the direction of said second means, and
   (b) means carried by said second means and coupled to said elongated members in a way which limits the movement of said members such that said planer surface is limited to said back and forth pivotal movement about said x and y axes.

6. A mechanism according to claim 5 wherein said means coupled to said elongated members limits said members to movement in a first plane through both of said members and movement in second planes which extend through said member and which are perpendicular to said first plane.

7. A mechanism according to claim 6 wherein said first plane extends parallel with one of said x of y axes in the direction of said z axis.

8. A mechanism according to claim 6 wherein said means coupled to said elongated member includes:
   (a) first block means coupled with said members and movable to a limited extent and in a predetermined way relative to said second means in a direction parallel with said second planes for causing said members to move in said second planes;
   (b) means for moving said first block means to said predetermined way;
   (c) second block means coupled with said first block means for movement with the latter and also coupled with said members and movable to a limited extent and in a predetermined way relative to said first block means and said second means in a direction parallel to said first plane for causing said members to move in said first plane; and
   (d) means for moving said second block means in said last-mentioned predetermined way.

9. A mechanism according to claim 8 wherein said first plane extends parallel with said y-axis.

10. A mechanism according to claim 1 wherein said planer surface is a mirror surface.

* * * * *